United States Patent
Cinotti

(10) Patent No.: US 11,101,046 B2
(45) Date of Patent: Aug. 24, 2021

(54) NUCLEAR REACTOR, WITH CONTROL AND SHUTDOWN RODS EXTERNAL TO THE CORE AND CORE SUPPORTING STRUCTURES

(71) Applicant: HYDROMINE NUCLEAR ENERGY S.A.R.L., Luxembourg (LU)

(72) Inventor: Luciano Cinotti, Recco (IT)

(73) Assignee: HYDROMINE NUCLEAR ENERGY S.A.RL., Luxembourg (LU)

( * ) Notice: Subject to any disclaimer, the term of this patent is extended or adjusted under 35 U.S.C. 154(b) by 292 days.

(21) Appl. No.: 16/098,001

(22) PCT Filed: May 4, 2017

(86) PCT No.: PCT/IB2017/052612
§ 371 (c)(1),
(2) Date: Oct. 31, 2018

(87) PCT Pub. No.: WO2017/191598
PCT Pub. Date: Nov. 9, 2017

(65) Prior Publication Data
US 2020/0328000 A1  Oct. 15, 2020

(30) Foreign Application Priority Data
May 4, 2016  (IT) .......... 102016000045629

(51) Int. Cl.
*G21C 1/03* (2006.01)
*G21C 1/14* (2006.01)
(Continued)

(52) U.S. Cl.
CPC .......... *G21C 1/03* (2013.01); *G21C 1/14* (2013.01); *G21C 7/10* (2013.01); *G21C 13/02* (2013.01)

(58) Field of Classification Search
CPC ... G21C 1/03; G21C 1/14; G21C 7/10; G21C 13/02
(Continued)

(56) References Cited

U.S. PATENT DOCUMENTS 10,699,816 B2 * 6/2020 Cinotti ............... G21C 1/03
2008/0310575 A1 12/2008 Cinotti

FOREIGN PATENT DOCUMENTS

EP      0375230 A2   6/1990
JP      H06230164 A  8/1994

OTHER PUBLICATIONS

International Search Report and Written Opinion for International Application No. PCT/IB2017/052612 dated Aug. 24, 2017.
(Continued)

*Primary Examiner* — Jack W Keith
*Assistant Examiner* — Daniel Wasil
(74) *Attorney, Agent, or Firm* — Dorsey & Whitney LLP

(57) ABSTRACT

The invention concerns a nuclear reactor comprising a vessel closed at the top by a radially external fixed closing structure and by a radially internal mobile closing structure. The vessel contains a core immersed in a primary cooling fluid and comprising fuel elements, control rods, shutdown rods, and a hydraulic separation structure delimiting a hot manifold and a cold manifold in which the primary fluid circulates. The control rods and the shutdown rods are inserted in respective penetrations of the fixed closing structure and are therefore located radially external to the mobile closing structure and external to an upper portion of the separation structure containing respective heads of the fuel elements.

6 Claims, 3 Drawing Sheets

(51) Int. Cl.
　　　*G21C 7/10*　　　(2006.01)
　　　*G21C 13/02*　　(2006.01)
(58) Field of Classification Search
　　　USPC .................................................. 376/223, 353
　　　See application file for complete search history.

(56)　　　　　　References Cited

OTHER PUBLICATIONS

Italian Application No. GE2015A000036 filed Jul. 13, 2016.

* cited by examiner

NUCLEAR REACTOR, WITH CONTROL AND SHUTDOWN RODS EXTERNAL TO THE CORE AND CORE SUPPORTING STRUCTURES

TECHNICAL FIELD

The present invention concerns a nuclear reactor.

PRIOR ART

In current practice nuclear reactors include a core, positioned in the lower part of the main vessel of the reactor, immersed in the primary fluid and formed of fuel elements supported by a supporting grid or suspended from the upper part. Reactor control rods are furthermore interposed between the fuel elements; exceptionally, in small-medium sized fast reactors, the control rods are positioned on the periphery of the core within the innermost crown of reflective/shielding elements. Generally the control rods are replaced by using the same replacement means used for replacement of the fuel elements and to avoid interference with said means it is necessary to disconnect them from their motor-drive element before refueling.

In patent application GE2015A000036, with amphora-shaped hydraulic separation structure, the shielding element crowns are eliminated, but nothing is said about the positioning of the control rods and their management during refueling operations, therefore the methods of the current state of the art apply.

SUBJECT OF THE INVENTION

An object of the present invention is to provide a nuclear reactor that overcomes the drawbacks highlighted of the known solutions and has further construction and safety advantages.

The present invention therefore concerns a nuclear reactor, as defined in the attached claim 1, with ancillary characteristics and plant configurations defined in the dependent claims.

BRIEF DESCRIPTION OF THE DRAWINGS

The invention is described in the following non-limiting embodiment example, with reference to the figures of the attached drawings, in which.

PREFERRED EMBODIMENT OF THE INVENTION

Figure 1:
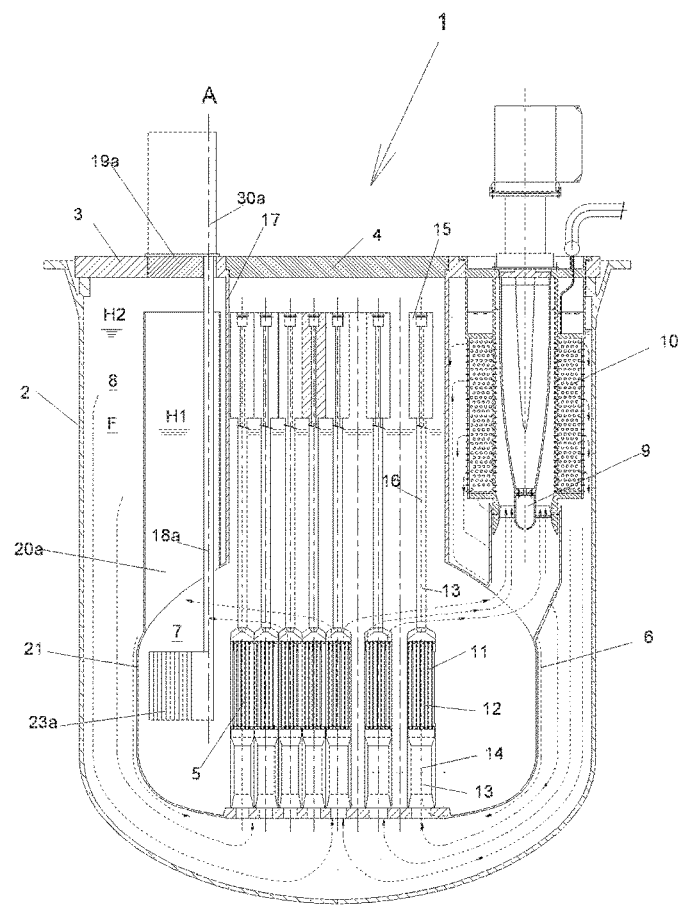
FIG. 1 is an overall schematic view in longitudinal section of a nuclear reactor according to the invention.
Figure 2:
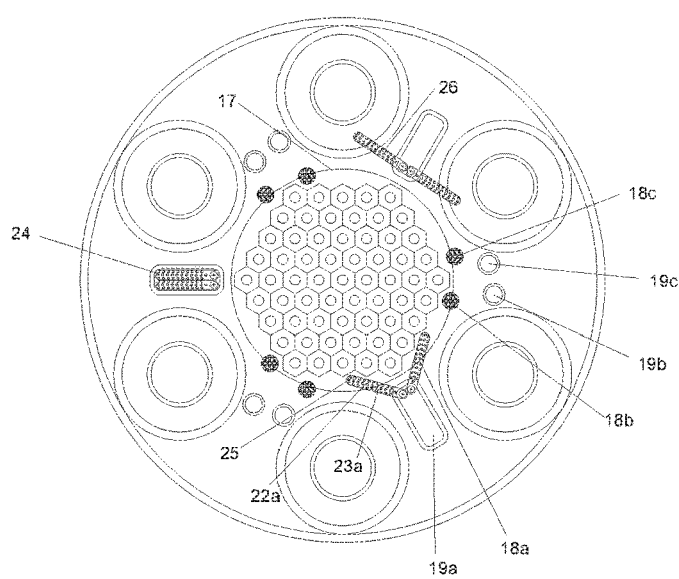
FIG. 2 is a schematic top view which indicates the positioning of the main components with respect to the axis of the reactor of FIG. 1.
Figure 3:
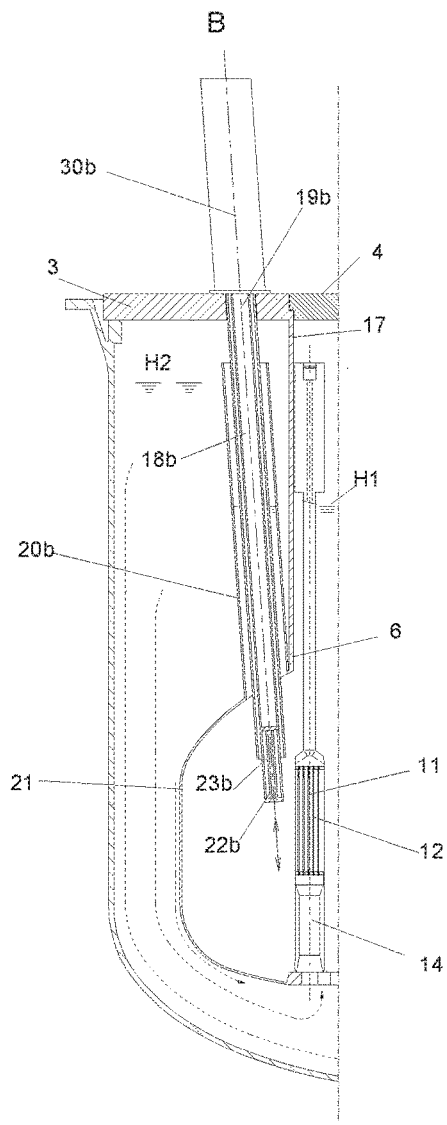
FIG. 3 is a schematic view in longitudinal section of a portion of the reactor of FIG. 1 which includes a first shutdown rod.
Figure 4:
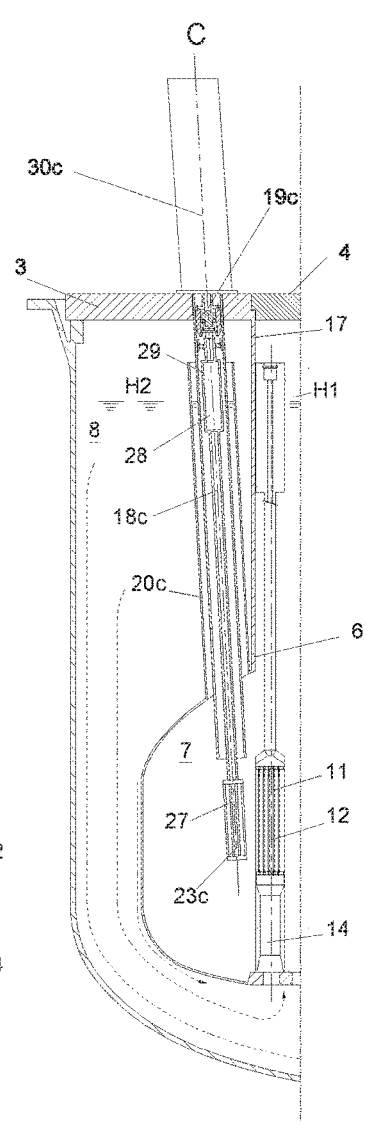
FIGS. 4 and 5 are schematic views in longitudinal section of a further portion of the reactor of FIG. 1 which includes a second shutdown rod, shown in respective operating positions.
Figure 5:
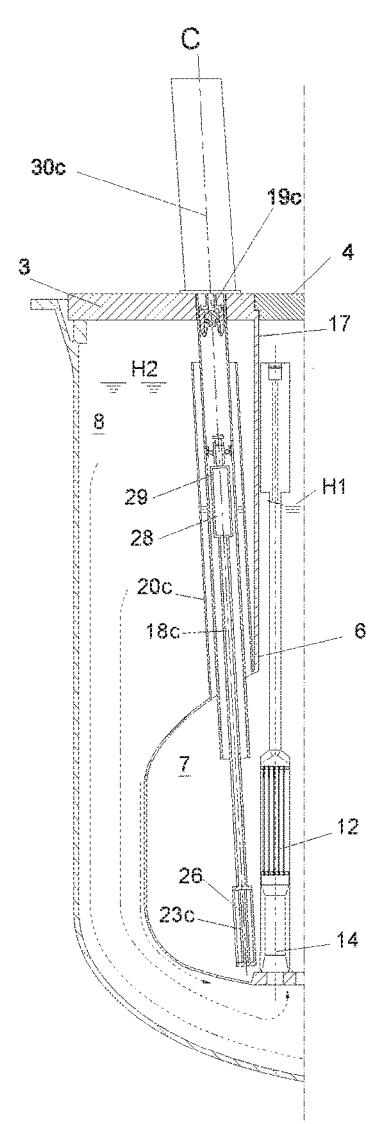

With reference to FIG. 1, showing in particular a nuclear reactor 1 cooled by liquid metal or molten salts, the nuclear reactor 1 comprises a substantially cup- or pool-shaped vessel 2, a radially external fixed closing structure 3 and a radially internal mobile closing structure 4, positioned above the vessel 2 with the fixed closing structure 3 positioned radially on the outside and around the mobile closing structure 4. The mobile closing structure 4 is a component consisting of various elements such as a plurality of rotating plugs at the same time forming part of the fuel transfer means and the primary containment structures, known in the art and therefore not described in detail.

The vessel 2 contains a core 5 and a hydraulic separation structure 6 delimiting a hot manifold 7 and a cold manifold 8 in which a primary cooling fluid F circulates for cooling the core 5. The primary fluid F has a free surface which in normal operation of the reactor 1 is at different levels H1, H2 in the manifolds 7,8. Inside the vessel 2, circulation pumps 9 are housed for circulating the primary fluid F, in addition to heat exchangers 10, through which the primary fluid F flows to transfer the power generated in the core 5 to a secondary fluid, and other components which are known and not illustrated. It is understood that the circulation pumps 9 of the primary fluid F and the heat exchangers 10 can also be positioned outside the vessel 2.

The hydraulic separation structure 5 preferably has an amphoralike shape, according to the solution known from patent application GE2015A000036, and is suspended from the closure structure 3 of the vessel 2.

The mobile closing structure 4 is positioned above the core 5 along a central axis of the reactor 1 and the fixed closing structure 3 is positioned, with reference to the central axis of the reactor 1, radially external to the mobile closing structure 4 and around the mobile closing structure 4, which is therefore radially internal to the radially external fixed closing structure 3. In other words, the mobile closing structure 4 and the fixed closing structure 3 are respectively radially internal and radially external with respect to the central axis of the reactor 1 and to the core 5.

With reference also to FIGS. 2-5, the core 5 comprises a plurality of fuel elements 11 which have respective active parts 12 and respective service parts 13; in particular, the service part 13 of each fuel element 11 comprises a foot 14 and a head 15 respectively positioned at the bottom and at the top of the fuel element 11 and a connection shaft 16 connecting the active part 12 and the head 15.

The heads 15 of the fuel elements 11 are circumferentially contained within the upper portion 17 of the separation structure 6 of which it constitutes the mechanical connection to the external fixed closing structure 3. The upper portion 17 of the separation structure 6 contains at the top also the internal mobile closing structure 4.

The reactor is characterized by three distinct types of control rods 18a and shutdown rods 18b, 18c which are inserted in respective penetrations 19a, 19b, 19c of the external fixed closing structure 3 and are therefore located outside the internal mobile closing structure 4 and outside the upper portion 17 of the separation structure 6, and re-enter lower down in the separation structure 6 through respective ducts 20a, 20b, 20c engaging the radially wider lower portion 21 of said separation structure 6 and extend above the free level H2 of the cold manifold 8. The control rods 18a and shutdown rods 18b, 18c extend downwards in proximity of the core 5, with respective end portions 22a, 22b, 22c provided with respective absorbers 23a, 23b, 23c.

The rods 18a perform the function of control of the reactor by means of motorized rotation around the axis A of the control mechanism 30a to bring respective absorbers 23a from a position 24 farther from the active part 12 of the core 5 to a position 25 of maximum proximity via intermediate positions 26.

The rods 18b perform the function of shutdown of the reactor by means of translation along respective axes B to bring respective absorbers 23b from a higher position at maximum distance from the active part 12 of the core 5 to a position facing it at maximum proximity. Said translation along respective axes B can be performed by means of the control mechanism 30b with motorized movement or with release and gravitational fall according to known technologies.

The rods 18c perform the function of shutdown of the reactor by means of translation along respective axes C to bring respective absorbers 23c from a lower position 26, facing the feet 14, at maximum distance from the active part 12 of the core 5, to a higher position 27 facing the active part 12 of the core 5 and at maximum proximity to it.

The shutdown rods 18c, designed for application to reactors with high density primary coolant, are provided with a float 28 consisting of a cylindrical casing 29 containing gas inside it which, as the level H1 of the hot manifold 7 varies, determines the position of the absorber 23c with respect to the active part 12 of the core 5 in a condition of disconnection from the control mechanism 30c.

Figures 6A, 6B, 6C:
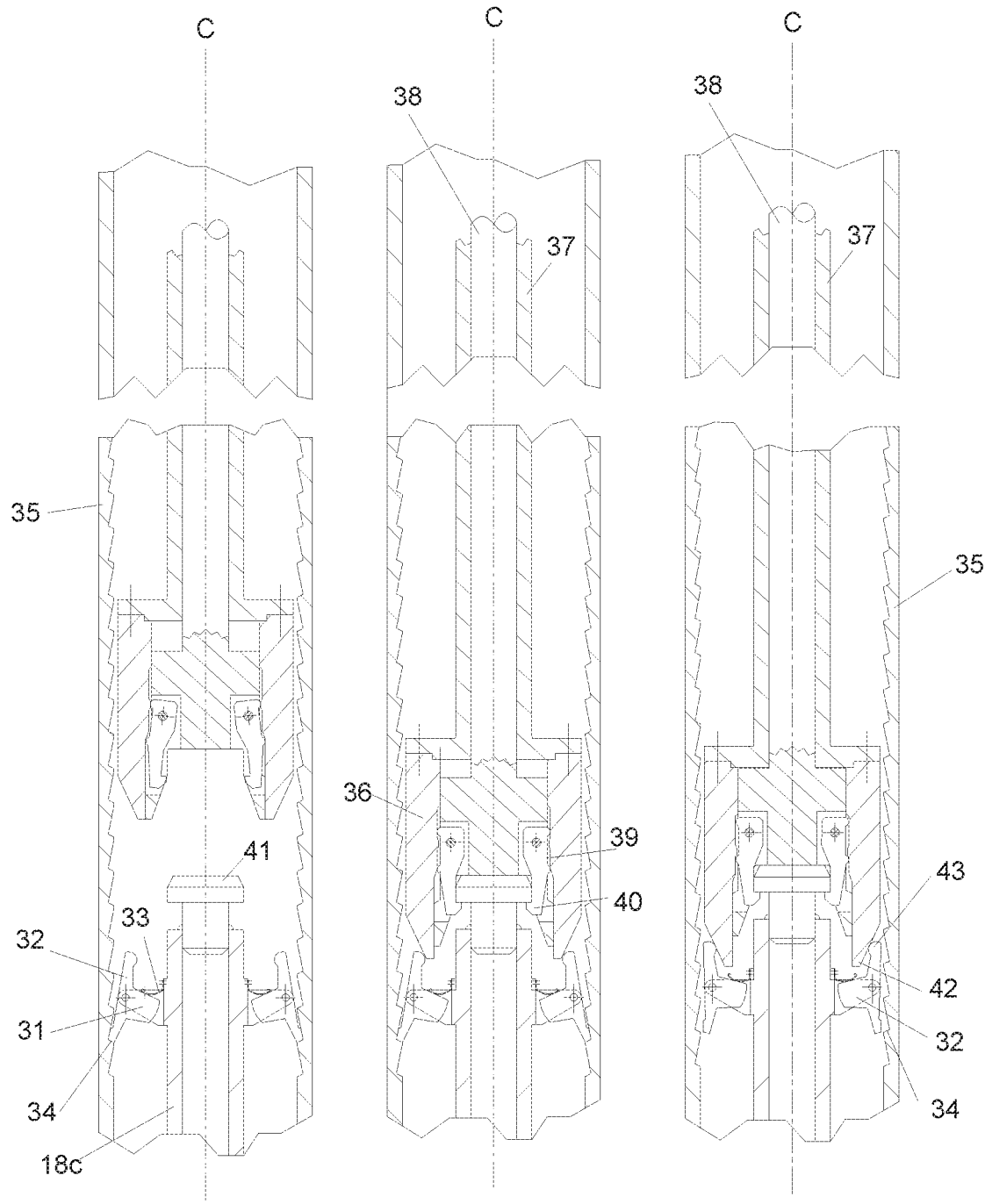
FIGS. 6a, 6b, 6c are enlarged details of FIGS. 4 and 5.

With reference also to FIGS. 6a, 6b and 6c, the shutdown rod 18c is provided with a non-return device 31 consisting of a plurality of levers 32 which, forced by an elastic element 33, engage on the saw tooth-shaped internal profile 34 of the cylindrical duct 35 in which the shutdown rod 18c runs.

A gripper 36, known in the art, belonging to a control device 30c, also known in the art, can translate along the axis C of the shutdown rod 18c and, by means of a longer stroke of the external bar 37 with respect to the internal bar 38 and an interaction of cams 39 and latches 40 of the control device 30c, engage on the head 41 of the shutdown rod 18c with the possibility of movement towards the top of the latter.

With reference also to FIG. 6c, the continuation of the stroke of the external bar 37 with respect to the bar 38 internal to it allows the shaped end 42 of the gripper 36 to engage on the upper internal profile 43 of the levers 32, disengaging them from the saw tooth-shaped internal profile 34 of the cylindrical duct 35, also permitting controlled vertical sliding of the shutdown rod 18c.

From the above, the advantages of the present invention are evident.

The support of the control rods 18a and shutdown rods 18b and 18c on the outside of the mobile internal closing structure 4 and on the outside of the core 5 guarantees complete mechanical decoupling between the core 5 of the reactor and the control rods 18a and shutdown rods 18b and 18c and in particular the thermal expansions or swellings of the fuel elements subject to neutron irradiation do not interfere with the movement of the rods.

Refuelling can be carried out without having to disconnect the control mechanisms 30a, 30b, 30c of the control rods 18a and shutdown rods 18b and 18c so that it is possible to move the mobile closing structure 4 which, in the traditional solutions, constitutes the support of the control rods.

The control rods 18a and shutdown rods 18b and 18c do not occupy positions inside the core 5, which can consequently be reduced in diameter.

The absence of structural material of the control and shutdown rods inside the core 5 allows reduction of the quantity of fissile material inside the core.

The absence of positions intended for control and shutdown rods inside the core 5 reduces the heterogeneity of the core and the associated power and temperature gradients.

The three systems of control rods 18a and shutdown rods 18b and 18c are differentiated from one another.

The shutdown system 18c controlled by float allows shutdown of the core due to increase in the level H1 of the primary coolant following slow-down of the circulation pumps 9, whatever the cause, and therefore constitutes a particularly reliable and diversified passive shutdown system of the reactor in the presence of a reduction in the primary coolant flow rate.

The shutdown system 18c controlled by float cannot be de-activated by a subsequent uncontrolled acceleration of the primary pumps 9 due to the non-return device 31 which can be de-activated only by restoring the mechanical connection between shutdown rod 18c and its control mechanism 30c.

Lastly it is understood that numerous modifications and variations can be made to the reactor described and illustrated here that do not depart from the scope of the attached claims.

The invention claimed is:

1. A nuclear reactor, comprising:
  a vessel closed at a top thereof by a radially external fixed closing structure and by a radially internal mobile closing structure, wherein:
    the vessel contains a core that is immersed in a primary cooling fluid of the vessel; and
    the core includes a plurality of fuel elements, control rods, shutdown rods, and a hydraulic separation structure delimiting a hot manifold and a cold manifold;
    the primary cooling fluid of the core circulates in the hot manifold and the cold manifold and, during normal operation of the nuclear reactor, a first free surface level of the primary fluid in the hot manifold differs from a second free surface level of the primary fluid in the cold manifold;
  circulation pumps for circulating the primary fluid; and
  heat exchangers;
  wherein the control rods and the shutdown rods are inserted in respective penetrations of the fixed closing structure and located radially external to the radially internal mobile closing structure and external to an upper portion of the hydraulic separation structure containing respective heads of the plurality of fuel elements;
  wherein the control rods and the shutdown rods are inserted in a radially wider lower part of the hydraulic separation structure via respective ducts that extend from a wall of the hydraulic separation structure above the second free surface of the primary fluid in the cold manifold.

2. The nuclear reactor of claim 1, wherein the control rods and shutdown rods have no mechanical connections with the core.

3. The nuclear reactor of claim 1, wherein rotation of the control rods around an axis of a control mechanism modifies a distance of respective neutron absorbers from an active part of the core.

4. The nuclear reactor of claim 1, wherein the shutdown rods are operated by a float which, via a down-up movement, positions respective neutron absorbers near an active part of the core when the circulation pumps of the primary fluid slow down.

5. The nuclear reactor of claim 4, further comprising a non-return device that allows upward displacement of the shutdown rods and blocks downward displacements to prevent falling in an event of untimely acceleration of the circulation pumps.

6. The nuclear reactor of claim 5, further comprising a control mechanism that engages first on a head of the shutdown rod and then on the non-return device allows, by a programmed intervention, safe re-actuation of the shutdown rod and re-location of the respective absorbers in a position farthest from the core.

* * * * *